Oct. 11, 1966   J. B. MERILA   3,277,680
IGNITION KEY HOLDER
Filed Sept. 25, 1964
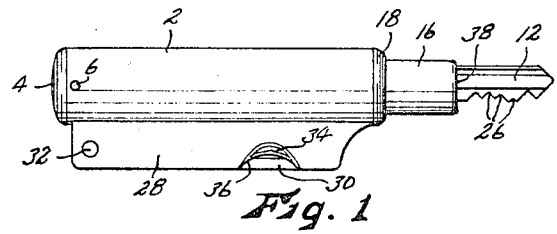
Fig. 1
Fig. 2
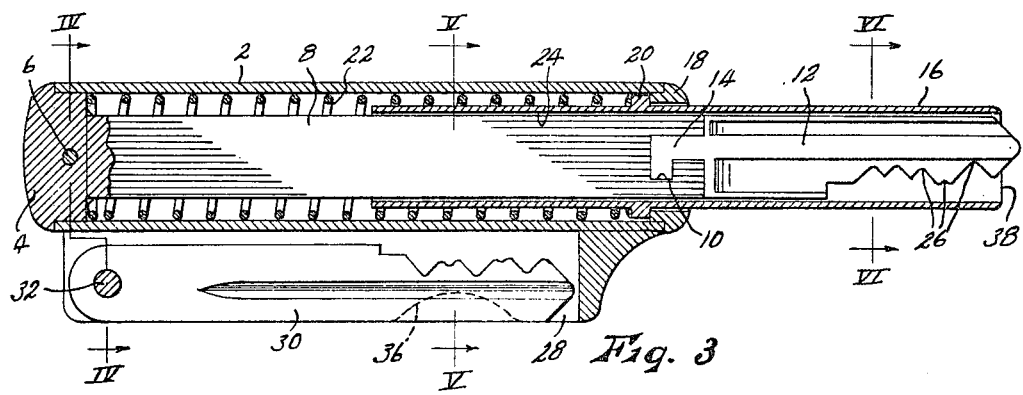
Fig. 3
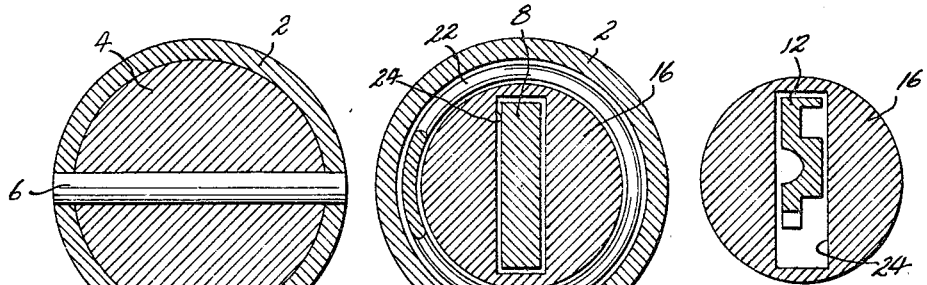
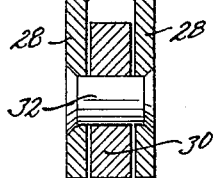
Fig. 4
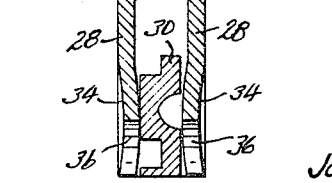
Fig. 5
Fig. 6
INVENTOR.
John B. Merila
BY John A. Hamilton
Attorney.

United States Patent Office 3,277,680
Patented Oct. 11, 1966

3,277,680
IGNITION KEY HOLDER
John B. Merila, 800 E. Armour Blvd., Kansas City, Mo.
Filed Sept. 25, 1964, Ser. No. 399,195
5 Claims. (Cl. 70—414)

This invention relates to new and useful improvements in key holders, and has particular reference to holders for automobile ignition keys.

The unsafe habit of many motorists of leaving their ignition keys in the ignition locks when they leave their cars is of course well known, as is the fact that this practice results in many automobile thefts which otherwise would not occur. While the police, insurance companies and other groups concerned directly or indirectly with automobile thefts conduct frequent compaigns warning motorists of the danger of the practice, carelessness on the part of many motorists of course continues.

The principal object of the present invention is, accordingly, the provision of a key holder which will substantially eliminate this unsafe practice, by means of a key holder whereby the key is automatically withdrawn from the lock, and deposited in the motorist's hand, whenever said key is turned to its "off" position to shut off the automobile engine, so that the motorists is forcibly reminded to place the key in his pocket, and not to leave it in the car.

Another object is the provision of a device of the character described wherein the key itself, as well as the key-withdrawing elements, are carried in a small holder or container which is neat and attractive in appearance, and small enough to be carried conveniently in the pocket, the key normally being substantially completely enclosed and protected within the holder except when in actual usage.

Other objects are simplicity and economy of construction, efficiency and dependability of operation, and adaptability for use with keys other than ignition keys, such as door keys.

With these objects in view, as well as other objects which will appear in the course of the specification, reference will be had to the accompanying drawing, wherein:

FIG. 1 is a side elevational view of an ignition key holder embodying the present invention, with the key exposed for use, FIG. 2 is a top plan view of the key holder as shown in FIG. 1, with the key enclosed, FIG. 3 is an enlarged sectional view taken on line III—III of FIG. 2, with parts left in elevation, FIG. 4 is an enlarged sectional view taken on line IV—IV of FIG. 3, FIG. 5 is an enlarged sectional view taken on line V—V of FIG. 3, and FIG. 6 is an enlarged sectional view taken on line VI—VI of FIG. 3.

Like reference numerals apply to similar parts throughout the several views, and the numeral 2 applies to a tubular body member of cylindrical form. The rearward end of said body member is closed by a rounded plug 4 secured in place by a pin 6 inserted transversely through said plug and said body member as best shown in FIG. 4. Said pin fits frictionally, so as to be removable to permit withdrawal of the plug. Affixed as by welding to the inner surface of said plug is an elongated shank 8 of rectangular cross-sectional contour corresponding closely to the overall cross-sectional contour of the usual automobile key. Said shank extends axially forwardly through body member 2, and has an angled notch 10 formed in the forward end thereof. An automobile ignition key 12 is affixed to the forward end of shank 8 to form an axial extension thereof, said key being disposed forwardly of body member 2. As shown, said key is removably attached to shank 8, being provided at its rearward end with an angled tongue 14 which engages snugly in notch 10 of the shank. Obviously, said tongue can be engaged in said notch only by relative movement of said key and shank in a direction at right angles to the axes thereof.

A plunger 16 of externally cylindrical form is disposed in body member 2, being of smaller diameter than the internal diameter of body member 2 and coaxial therewith, and being slidably supported in a ring-like collar 18 affixed permanently in the forward end of the body member. Said plunger is provided intermediate its ends with an external peripheral flange 20 (see FIG. 3) which normally abuts the innerface of collar 18. A helical compression spring 22 is disposed within the body member around plunger 16 and shank 8, said spring abutting at its forward end against flange 20 and at its rearward end against plug 4, whereby the plunger is biased forwardly. Plunger 16 has a rectangular bore 24 formed axially throughout the length thereof, said bore receiving shank 8 and key 12 slidably but non-rotatably therein. It will be seen in FIG. 3 that when flange 20 is pressed against collar 18 by spring 22, plunger 16 extends forwardly of the body member to enclose all but the extreme tip portion of key 12, for a purpose which will presently appear. It will be understood that while key 12 must of course be furnished to the purchaser in blank form it may be removed from the assembly after first pressing out pin 6 and withdrawing shank 8, in order that it may conveniently be gripped in a key cutting machine to form the necessary notches 26 therein. Once the parts have been reassembled, key tongue 14 is prevented from becoming disengaged from shank notch 10 by the close fit of these parts in bore 24 of the plunger.

Affixed as by welding to the external surface of body member 2 are a pair of generally parallel, spaced apart walls 28 between which may be mounted a second key 30 by means of a pivot pin 32, whereby said key may be pivoted outwardly for use. This key may be the trunk and glove compartment key of the automobile. Walls 28 are formed of resilient metal, and have inwardly offset portions 34 for engaging and frictionally gripping key 30 therebetween to hold it normally in concealed position between said walls, as best shown in FIG. 5. The outer edges of said walls have finger notches 36 formed therein whereby said key may be gripped to withdraw it. Walls 28 serve not only as an enclosure for key 30, but also as a handle whereby body member 2 may be rotated about its axis in the use of key 12, as will appear.

In use, to insert the ignition key 12 in the ignition lock, the motorist holds body member 2 and places the forward end surfaces 38 of plunger 16 against the face of the lock cylinder, the projecting extreme end portion of the key acting as a "finder" for easily locating said key in the keyhole of said lock cylinder (not shown). The body member 2 is then pressed forwardly, inserting key 12 fully into the lock, while the face of the lock cylinder, pressing against the abutment face 38 of plunger 16, forces said plunger rearwardly into the body member against the pressure of spring 22. The parts then have the relative position shown in FIG. 1. Then, still maintaining forward pressure on the body member, the key is turned to its "on" position to energize the automobile ignition system. The body member 2 may then be released, whereupon spring 22 exerts a substantial force on plunger 16, urging it against the lock face and tending to withdraw the key from the lock. However, the key is not withdrawn from the lock at this time, since once it has been turned, it is secured against withdrawal by the engagement of the tumbler pins of the lock (not shown) in notches 26 thereof, as is well understood in the art. However, whenever the key is turned to its "off" position, the key is freed for withdrawal and is immediately and automatically withdrawn from the lock by rearward movement of the body member relative to plunger 16, under the pressure of spring 22. Since the motorist must of course grasp the body member 2 to turn the key to its "off" position, the automatic withdrawal of the key from the lock, as just described, leaves the key and holder free in his hand, and he is thereby forcibly reminded that he should take it with him when he leaves the vehicle.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. In combination:
   (a) a key for a pin tumbler lock, and
   (b) a holder for said key comprising:
      (1) a hollow body member,
      (2) means affixing said key to said body member with said key disposed externally of said body member, said affixing means comprising a shank affixed coaxially in said body member and extending the full length thereof, said key being affixed to and forming an axial extension of said shank, a tubular plunger encircling said shank and said key,
      (3) said tubular plunger carried by said body member for sliding movement parallel to its axis and coaxially of said key, said plunger being movable between an extended position wherein it substantially encloses said key and a retracted position in which the lock-engaging portion of said key is exposed, and having at its outer end an abutment face adapted to engage the face of said pin tumbler lock, and
      (4) resilient means biasing said plunger yieldably toward its extended position.

2. The combination as recited in claim 1 wherein said key, when said plunger is in its extended position, extends slightly outwardly from said plunger through the abutment face thereof, whereby to act as a finder for locating the keyhole of said lock.

3. The combination as recited in claim 1 wherein said key and shank are provided with interengaging parts whereby they may be connected to or disconnected from each other by relative movement in a direction transverse to their axes, said relative movement normally being prevented by their enclosure within the bore of said tubular plunger, and wherein said shank is detachably connected to said body member to permit withdrawal thereof from said plunger.

4. The combination as recited in claim 1 wherein said resilient means comprises a spring totally enclosed within said body member and urging said plunger yieldably toward its extended position.

5. In combination:
   (a) a key for a pin tumbler lock, being elongated and adapted to have the forward end thereof inserted longitudinally into said lock, and having its rearward end formed to present a planar angled tongue.
   (b) a tubular body member,
   (c) a plug detachably fixed in the rearward end of said body member,
   (d) a shank fixed at one end to said plug and extending coaxially through said body member, said shank having an angled notch at the free end thereof engaging the tongue of said key, whereby said shank and key may be disconnected or connected by relative movement transverse to their axes, said key when so connected having its lock-engaging portion disposed externally of said body member,
   (e) a tubular plunger carried coaxially for longitudinal sliding movement in the forward end portion of said body member, the bore of said plunger embracing said shank and said key to prevent relative lateral movement thereof, said plunger being movable between an extended position in which it projects sufficiently from said body member to substantially enclose said key, and a retracted position in which the lock-engaging portion of said key is exposed, the outer end of said plunger constituting an abutment face adapted to engage the face of said lock, and
   (f) a spring enclosed entirely within said body member on biasing said plunger yieldably toward its extended position.

References Cited by the Examiner

UNITED STATES PATENTS

| 1,739,814 | 12/1929 | Andersen | 70—457 |
| 2,625,814 | 1/1953 | Mullan | 70—414 |
| 2,738,667 | 3/1956 | Thompson | 70—414 |
| 2,989,861 | 6/1961 | Schefman | 70—414 |

EDWARD C. ALLEN, *Primary Examiner.*

PERRY TEITELBAUM, *Assistant Examiner.*